United States Patent [19]

Brown et al.

[11] Patent Number: 5,228,726
[45] Date of Patent: Jul. 20, 1993

[54] EXHAUST SYSTEM CLAMP

[75] Inventors: David W. Brown, Ada; Garth A. Souter, Grand Rapids; Gary L. Wells, Augusta; Lance Mews, Caledonia, all of Mich.

[73] Assignee: Benteler Industries, Inc., Grand Rapids, Mich.

[21] Appl. No.: 717,096

[22] Filed: Jun. 18, 1991

[51] Int. Cl.$^5$ .................. F16L 55/00; F16L 27/12
[52] U.S. Cl. .................. 285/187; 285/302; 285/341; 285/334.2; 285/334.3; 277/119; 277/190; 277/115
[58] Field of Search ............ 285/302, 187, 341, 334.2, 285/334.3, 910; 277/105, 115, 117, 190, 119, DIG. 9

[56] References Cited

U.S. PATENT DOCUMENTS

| 264,965 | 9/1882 | Shook | 285/302 |
|---|---|---|---|
| 958,752 | 5/1910 | Mackensen | 285/302 |
| 1,434,952 | 11/1922 | Johnson | 285/356 |
| 1,873,621 | 8/1932 | Moore | 285/368 |
| 2,009,650 | 7/1935 | Claussen | 285/368 |
| 2,458,024 | 1/1949 | Pinaire | 285/302 |
| 2,614,887 | 10/1952 | Shields | 285/302 |
| 2,780,482 | 2/1957 | Brown | 285/302 X |
| 3,002,771 | 10/1961 | Chakroff | 285/302 |
| 3,304,105 | 2/1967 | Hill | 285/302 |
| 3,704,995 | 12/1972 | Hetherington | 285/412 X |
| 3,885,821 | 5/1975 | Philibert | 285/302 |
| 4,522,282 | 6/1985 | Yamamoto | 180/219 |

FOREIGN PATENT DOCUMENTS 461899 10/1968 Switzerland ............ 285/233

Primary Examiner—Eric K. Nicholson
Assistant Examiner—Heather Chun
Attorney, Agent, or Firm—Price, Heneveld, Cooper, DeWitt & Litton

[57] ABSTRACT

An engine exhaust conduit sealed joint having controlled axial expansion between two telescopically interfitted ducts with a slide seal therebetween, and the ducts held by first and second clamp connectors, one of the ducts having an annular shoulder and one of the clamp connectors being hat-shaped to extend axially on both sides of this shoulder with an annular stop surface to engage the annular shoulder. The seal has an arcuate cross section in engagement with the outer periphery of the one duct, and having a pair of opposite, annular, diagonal surfaces, one of which is engaged by the one clamp connector and the other of which is engaged by a flared end of the other duct which in turn is engaged by the other clamp connector.

24 Claims, 2 Drawing Sheets

EXHAUST SYSTEM CLAMP

BACKGROUND OF THE INVENTION

This invention relates to engine exhaust systems, and particularly to sealed connections between tubular components such as the manifold outlet pipe and the crossover pipe. Typically, connections of this type are made by clamping the ends of the components together against a gasket, or telescopically interfitting and welding them together. However, if the components do not clearly match due to angular variations and/or alignment position variations, the seal may be initially dysfunctional. Under conditions of elevated temperatures, thermal expansion forces can increase the potential for leakage and failure.

The engine exhaust system seal depicted in FIG. 4 herein, previously invented by Gary L. Wells, one of the inventors herein, and another person not obligated to assign to the assignee herein, achieves an improved seal connection. Under conditions of cyclical, high and low operational temperatures, however, the joint of that structure could conceivably come apart.

SUMMARY OF THE INVENTION

The present invention enables the engine exhaust system and components to expand under elevated temperature conditions, retain the seal, and yet without the joint becoming disassembled with repeated heating and cooling cycles due to expansion of curved exhaust conduits tending to pull the joint apart. The invention combines the seal with expansion limiting features to achieve a unique assembly.

The two exhaust conduits telescopically interfit with each other, and have an annular seal member in a sliding fit around the smaller diameter conduit, the seal member being pressed against the smaller diameter conduit by a pair of clamp connectors. The smaller diameter conduit has an integral, outwardly extending protrusion around its periphery, convexly curved in cross section. The clamp connector around this conduit extends axially behind this protrusion and curves radially inwardly toward the conduit with a concavely curved stop flange normally axially spaced rearwardly of the protrusion, but capable of engaging the protrusion in a matching connection upon the occurrence of a predetermined maximum axial thermal expansion of the conduit system, to prevent disassembly of the joint.

These and other objects, advantages and features of the invention will become apparent upon studying the following specification in conjunction with the drawings.

DESCRIPTION OF THE PREFERRED EMBODIMENT

Figure 1:
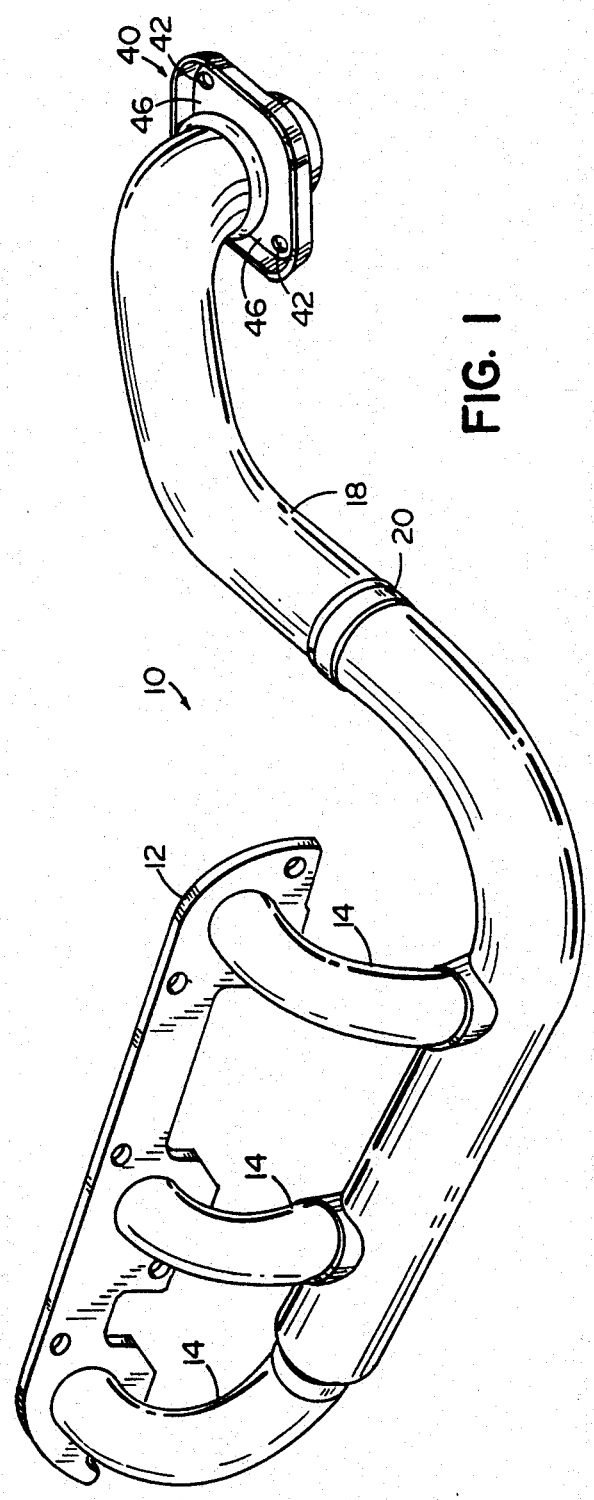
FIG. 1 is a perspective view of an exhaust manifold and crossover pipe conduit with one portion of the novel joint.

Referring now specifically to the drawings, the complete assembly 10 depicted in FIG. 1 is shown to include a planar exhaust manifold flange 12 for mounting to the cylinder head (not shown) of a vehicle internal combustion engine. This flange is sealingly interconnected with a plurality of conventional runners 14 to accommodate the exhaust gases from a plurality of cylinders, e.g., three in number. These runners are sealingly connected to the main body or log 16 of the exhaust manifold typically by welding. The discharge end of log 16 is connected to a crossover conduit 18 at joint 20 as by welding.

Figure 2:
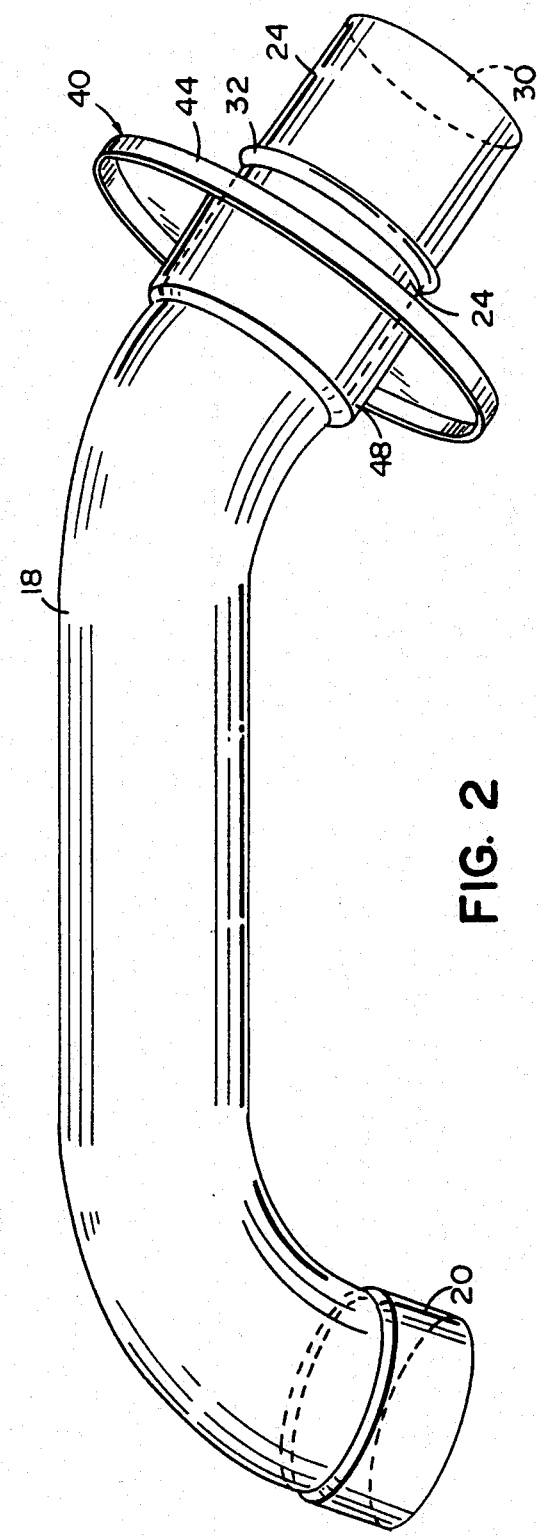
FIG. 2 is an elevational view of the crossover pipe conduit and one portion of the novel joint.
Figure 5:
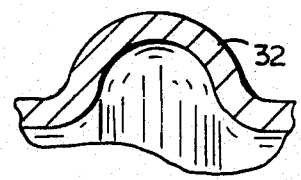
FIG. 5 is a sectional elevational view of a radially outwardly extended annular surface protrusion or bead on the crossover pipe conduit at the joint, taken on plane V—V of FIG. 3.
Figure 3:
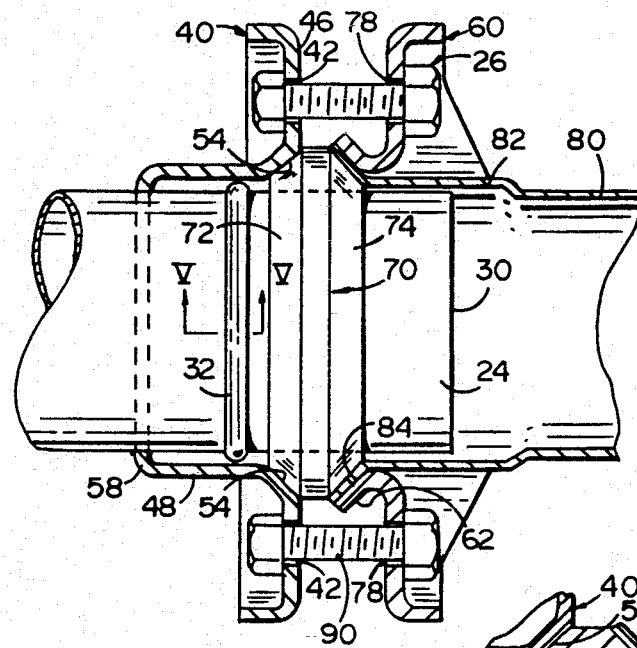
FIG. 3 is a sectional elevational view of the novel limited displacement joint and seal assembly.
Figure 8:
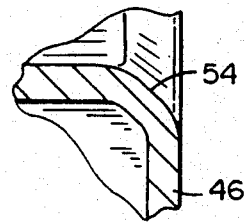
FIG. 8 is an enlarged sectional elevational view of a portion of the first clamp connector.

At the discharge end of the crossover conduit is a special limited displacement joint and seal assembly 26. The discharge end portion 24 of crossover conduit 18 (FIG. 2) comprises a cylindrical configuration having a circular discharge outlet 30 at the end, and spaced therefrom an annular, radially outwardly extending protuberance 32 formed integrally into cylindrical portion 24. This protuberance has an arcuate, semicircular configuration in axial cross section (FIG. 5) with a radius having a relationship to the radius on the rear portion of the first clamp connector 40. Clamp connector 40 is generally annular in configuration, extending around the cylindrical end portion 24 of crossover conduit 18, extending radially outwardly on opposite sides of the conduit to form a pair of webs 46 containing connector receiving orifices 42. A peripheral axially extending flange 44 reinforces these webs 46 and the connector generally. The annular portion of connector 40 extending around end portion 30 comprises a cylindrical body 48 having an inner radius greater than the exterior radius of cylindrical end portion 24 to extend therearound in a spaced relationship therefrom. The inner diameter of body 48 is also greater than the outer diameter of protrusion 32 (FIG. 3) to extend on both sides of the protrusion. The web portions 46 of connector 40 are, in assembled condition, axially located between protrusion 32 and opening 30, with cylindrical body 48 extending rearwardly over and axially past protrusion 32 to the opposite side thereof, where the end of cylindrical body 48 terminates in a radially inwardly extending arcuate stop flange 58 around a central opening 52 through which cylindrical end portion 24 extends. Flange 58 has a concave arcuate curvature having a special relationship with respect to the convex curvilinear outer surface of protrusion 32. More specifically, the inner radius of concavely curved flange 58 is close to, but preferably slightly larger than, the outer radius of protrusion 32. In practice, it has been found that an inner radius of 3 mm for concavely curved flange 58 is preferred, in combination in a radius of 2.9 mm for the convex curvature of protrusion 32, utilizing a wall thickness of 0.9 mm for the protrusion, and an inner radius of 2.0 mm.

Figure 6:
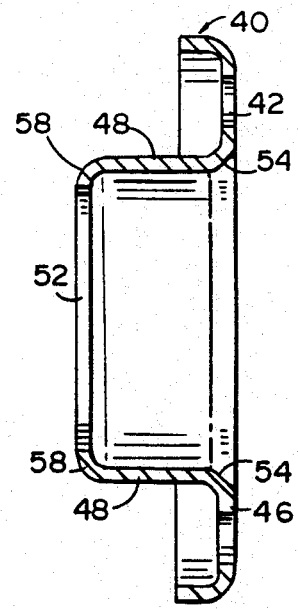
FIG. 6 is a sectional elevational view of the first clamp connector portion of the joint and seal.
Figure 7:
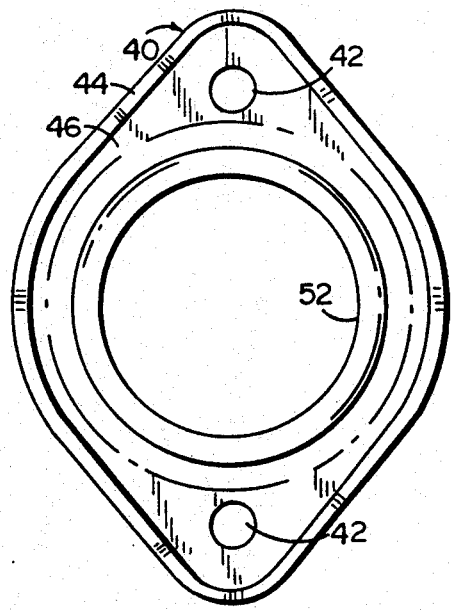
FIG. 7 is an end elevational view of the component in FIG. 6, viewed from the right side of FIG. 6.

The juncture between webs 46 and cylindrical body 48 has an inner diameter portion, at least part of which preferably contains a diagonal annular flat 54 (FIG. 6) at an angle of about 45 degrees. This annular flat engages with a corresponding diagonal annular face 72 on one axial side of seal 70. A similar diagonal face 74 is on the opposite axial side of seal 70 for engagement with the flared end of exhaust pipe conduit 80, in a manner to be explained hereinafter.

First clamp connector 40 specially cooperates with a second clamp connector 60 and annular seal 70. The second clamp connector 60 is also generally annular in configuration, extending around the exhaust pipe conduit 80. Conduit 80 has an enlarged diameter portion 82 at least at the inlet end thereof, having an inner diameter larger than the outer diameter of end portion 24 of conduit 18, to receive this end portion 24 telescopically. The terminal portion of conduit 80 is flared radially and axially into an annular diagonal flare 84 on an angle of about 45 degrees or so, to cooperate with the correspondingly by tapered surface 74 of seal member 70.

Figure 4:
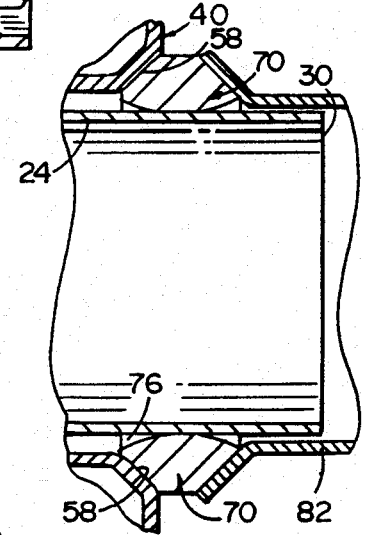
FIG. 4 is a fragmentary sectional view of a portion of the seal and joint assembly in FIG. 3.

Annular seal 70 preferably has a convexly curved inner surface 76 (FIG. 4) engaging the outer periphery of cylindrical end portion 24 of conduit 18. Specifically, the inner surface of the seal is shaped like a portion of a toroid having an arcuate surface in cross section comparable to a part of a sphere. The radius of the central portion of this curved, convex surface, i.e. where it engages the duct, has a different radius than the outer portions straddling this central portion. The central portion generally has a radius of curvature preferably larger than the inner diameter of the seal, and smaller than the outer diameter of the seal. The outer portions have a radius of curvature substantially smaller than the central portion, e.g., about one-quarter to one-third that of the central portion. In the particular preferred example illustrated in FIG. 4, the seal has an outer diameter of 78.0 mm, an inner diameter of 58.15 mm, the central portion of the inner curved surface having a radius of 67.0 mm, and the outer two portions each having a radius of 18.6 mm. Such a seal is shown to have a width of 20.0 mm. The larger radius of curvature in the central portion of the inner surface of the seal enables effective sealing with less deformation than if the smaller radius was extended clear across the curvilinear surface. The smaller radius portions on opposite sides of this central portion enable insertion assembly of the pipe and seal at greater angular misalignment than if the larger radius extended from the central portion clear to the opposite edges. The annular diagonal seal surfaces 72 and 74, each basically frustoconical in configuration, are each at an angle of about 45 degrees to the axis of the seal and the conduit, with the angle of the connector clamp surfaces 54 and 62, the duct flange 62 and the conduit flare 84 also being at about 45 degrees.

The seal material is of a material comparable to that conventionally used on exhaust pipe systems, preferably a pressed material formed of woven wire and having graphite/oil lubricant therein, such that the radially inwardly directed force vector will cause slight displacement deformation of the seal material at said convex inner surface for annular sealing engagement against the tubular exhaust pipe therein.

When the novel assembly is assembled, first clamp connector 40 is placed on conduit 18 and positioned near protrusion 32, with cylindrical body 48 extending over protrusion 32; second clamp connector 60 is placed on conduit 80 adjacent flare 84; annular seal 70 is placed over the cylindrical end portion 24 of conduit 18; a pair of machine bolts or the like serving as fasteners 90 are extended through openings 42 and 78 of clamp connectors 40 and 60, respectively, and suitable nuts are threadably attached to the bolts to draw the two clamp connectors toward each other and in engagement with the seal subassembly. More specifically, annular surface portion 54 of clamp connector 40 engages diagonal annular surface 72 of seal 70, while the radially outwardly diagonally extending flange 62 engages the flared end 84 of conduit 80 and presses it against like diagonally annular surface 74 of seal 70. Further tightening of fasteners 90 causes some radially inward as well as axial deformation of the seal for assuring a sealing relationship between the two clamp connectors and the seal, and the convex inner annular surface of seal 70 against the outer periphery of cylindrical end portion 24 of conduit 18.

Under conditions of cycles of high temperature operation, and subsequent cooling, the exhaust conduit assembly 10 will axially expand thermally and not fully contact, thereby causing conduit end portion 24 to move axially away from conduit 80. A predetermined limited amount of this axial expansion is allowed to occur by axial movement of conduit portion 24 in seal 70, until the curved outer periphery of protrusion 32 engages the curved inner surface of stop flange 58 of connector 40, preventing the conduits from becoming disengaged.

Conceivably, various alterations and dimensional relationships of the combination can be modified to suit particular circumstances and installations. The preferred embodiment disclosed and described in detail as exemplary is therefore not intended to be limiting of the invention, which is to be limited only by the scope of the appended claims and the reasonably equivalent structures to those defined therein The embodiments of the invention in which an exclusive property or privilege is claimed are defined as follows:

1. An engine exhaust conduit sealed joint for a vehicle exhaust system, allowing controlled movement occurring with repeated heating and cooling cycles of the exhaust system which causes expansion of curved exhaust conduits to tend to pull said joint apart, comprising:

a first conduit having a cylindrical end portion with an outer diameter and an open end;

a second conduit having an enlarged, cylindrical portion with an inner diameter greater than said outer diameter of said first conduit end portion, to slidably receive said first conduit end portion;

said second conduit having an open end and an outwardly flared end portion encircling said open end;

a first annular clamp connector around said first conduit end portion;

a second annular clamp connector around said second conduit cylindrical portion;

fastener means for biasing said clamp connectors axially toward each other;

an annular seal member between said clamp connectors and around said first conduit cylindrical end portion, said seal member having a pair of outwardly oriented, diagonal engagement surfaces on axially opposite sides of said seal member;

said clamp connectors having diagonal engagement surfaces aligned with respective ones of said seal diagonal surfaces whereby said first clamp connector presses one said side of said seal member and said second clamp connector presses said flared end portion against the other said side of said seal member so that said seal member is pressed radially against said first conduit cylindrical end portion with a sliding seal fit;

said first conduit cylindrical end portion having a radially outward surface protrusion spaced from said open end;

said first clamp connector having a radially projecting stop surface positioned on the axially opposite side of said protrusion from said first conduit open end, and axially aligned with and spaced behind said protrusion, to allow said first conduit to sealingly, slidingly move along said seal member until said protrusion abuts said stop surface to limit movement and prevent disconnection of said joint.

2. The engine exhaust conduit sealed joint in claim 1 wherein said stop surface is a radially inwardly directed flange, and said protrusion is integrally formed peripherally in said first conduit.

3. The engine exhaust conduit sealed joint in claim 2 wherein said stop surface flange is concavely curved and said protrusion is annular and arcuately, convexly curved to interfit said concavely curved flange.

4. The engine exhaust conduit sealed joint in claim 3 wherein said stop surface flange has a concave arcuate curvature of a first radius, said protrusion has a convex arcuate curvature of a second radius, and said second radius is the same as or slightly smaller than said first radius.

5. The engine exhaust conduit sealed joint in claim 1 wherein said protrusion is an integral annular protrusion extending peripherally outwardly from said first conduit, and having a convex, arcuately curved outer surface, and said stop surface is a concave, arcuately curved surface substantially matching said convex outer surface to be capable of a mating engagement therewith.

6. The engine exhaust conduit sealed joint in claim 5 wherein said first clamp diagonal engagement surface has an annular diagonal flat thereon to seal against said seal member.

7. The engine exhaust conduit sealed joint in claim 1 wherein said first clamp connector comprises radial flange means cooperable with said fastener means, a cylindrical body extending from said radial flange means to said radially inwardly projecting stop surface, and said cylindrical body extending over and beyond said protrusion to be on both sides of said protrusion.

8. The joint in claim 1 wherein said annular seal member has an inner annular surface which is convexly curvilinear in cross section for engaging said first conduit.

9. The joint in claim 8 wherein said seal diagonal engagement surfaces are at an angle of about 45 degrees relative to said axis of said seal.

10. The joint in claim 8 wherein said convex curvilinear surface has a central portion on a radius of curvature which is about an amount greater than the inner diameter of said inner convex surface and less than the outer diameter of said seal.

11. The joint in claim 10 wherein said convex curvilinear surface has outer portions adjacent said central portion, on a radius of curvature substantially less than said central portion radius of curvature.

12. The joint in claim 11 wherein said radius of curvature of said outer portions is about one-fourth said radius of curvature of said central portion.

13. An engine exhaust conduit assembly including a limited disengagement, sealed joint subassembly comprising:

an exhaust gas conduit having a circular, open, gas-discharge end and a cylindrical surface terminating at said open end;

an integral, annular protrusion extending radially outwardly from said cylindrical surface spaced axially from said open end, said protrusion having an axially oriented abutment surface on the side of said protrusion away from said open end;

a clamp connector around said conduit, movably axially along said cylindrical surface, and having outwardly extending portions for receiving fasteners to connect to a second connector;

an annular seal engaged by said clamp connector and sealed against said exhaust gas conduit;

said clamp connector having a generally cylindrical portion extending axially over said conduit cylindrical surface from a location between said protrusion and said open end to a location behind said protrusion, and terminating in an arcuate stop flange axially behind said protrusion and axially engageable with said axially oriented abutment surface of said protrusion, whereby said joint allows movement because of said engine exhaust conduit assembly expanding when repeatedly heated and cooled until said protrusion abuts said stop flange.

14. The engine exhaust conduit, limited disengagement subassembly in claim 13 wherein said outwardly extending portions of said clamp connector include an annular portion between said fastener receiving portions and said generally cylindrical portion of said flange connector, forming an annular sealing surface for engaging the annular seal.

15. The engine exhaust conduit, limited disengagement subassembly in claim 14 wherein said annular sealing surface comprises a narrow, flat area diagonal to the axis of said conduit.

16. An engine exhaust conduit sealed joint for a vehicle exhaust system, allowing controlled movement occurring with repeated heating and cooling cycles of the exhaust system which causes expansion of curved exhaust conduits to tend to pull said joint apart, comprising:

a first conduit having a cylindrical end portion with an outer diameter and an open end;

a second conduit having an enlarged, cylindrical portion with an inner diameter greater than said outer diameter of said first conduit end portion, to slidably receive said first conduit end portion;

said second conduit having an open end and an outwardly flared end portion encircling said open end;

a first annular clamp connector around said first conduit end portion;

a second annular clamp connector around said second conduit cylindrical portion;

fastener means for biasing said clamp connectors axially toward each other;

an annular seal member between said clamp connectors and around said first conduit cylindrical end portion;

said clamp connectors being cooperable with said seal to create a sliding seal fit with said first cylindrical end portion;

said first conduit cylindrical end portion having a radially outward annular surface protrusion spaced from said open end;

said first clamp connector having a radially inwardly projecting stop surface positioned on the axially opposite side of said protrusion from said first conduit open end, and axially aligned with and spaced behind said protrusion, to allow said first conduit to sealingly, slidingly move along said seal member until said protrusion abuts said stop surface to limit movement and prevent disconnection of said joint.

17. The engine exhaust conduit sealed joint in claim 16 wherein said first clamp connector comprises radial flange means cooperable with said fastener means, a cylindrical body extending from said radial flange means to said radially inwardly projecting stp surface, and said cylindrical body extending over and beyond said protrusion to be on both sides of said protrusion.

18. The engine exhaust conduit sealed joint in claim wherein said stop surface is a radially inwardly directed flange, and said protrusion is integrally formed peripherally in said first conduit.

19. The engine exhaust conduit sealed joint in claim wherein said stop surface flange is concavely curved and said protrusion is arcuately, convexly curved to interfit said concavely curved flange.

20. The engine exhaust conduit sealed joint in claim 16 wherein said seal has a pair of opposite frustoconical annular surfaces for compression by said first and second clamp connectors, and an inner annular surface which is convexly curvilinear in cross section engaging said first conduit.

21. The engine exhaust conduit sealed joint in claim wherein said outer surfaces are at an angle of about 45 degrees relative to said axis of said body.

22. The engine exhaust conduit sealed joint in claim wherein said convex curvilinear surface has a central portion on a radius of curvature which is about an amount greater than the inner diameter of said inner convex surface and less than the outer diameter of aid seal.

23. The engine exhaust conduit sealed joint in claim 22 wherein said convex curvilinear surface has outer portions adjacent said central portion, on a radius of curvature substantially less than said central portion radius of curvature.

24. The engine exhaust conduit sealed joint in claim 23 wherein said radius of curvature of said outer portions is about one-fourth said radius of curvature of said central portion.

* * * * *

UNITED STATES PATENT AND TRADEMARK OFFICE
CERTIFICATE OF CORRECTION

PATENT NO. : 5,228,726  
DATED : Jl. 20, 1993  
INVENTOR(S) : David W. Brown et al Page 1 of 2

It is certified that error appears in the above-indentified patent and that said Letters Patent is hereby corrected as shown below:

Column 3, line 17  
Delete "by";

Column 3, line 52  
Delete "material" (first occurence);

Column 4, line 33  
After "therein" insert -- . --;

Column 5, line 6  
After "radially" insert --inwardly--;

Column 5, line 67  
"scaled" should be --sealed--;

Column 6, line 62  
After "first" insert --conduit--;

Column 7, line 11  
"projecting stp" should be --projecting stop--;

Column 7, line 15  
Before "wherein" insert --16--;

UNITED STATES PATENT AND TRADEMARK OFFICE
CERTIFICATE OF CORRECTION

PATENT NO. : 5,228,726
DATED : Jul. 20, 1993
INVENTOR(S) : David W. Brown et al

It is certified that error appears in the above-indentified patent and that said Letters Patent is hereby corrected as shown below:

Column 7, line 19
Before "wherein" insert --18--;

Column 8, line 6
Before "wherein" insert --20--;

Column 8, line 9
Before "wherein" insert --20--;

Signed and Sealed this

Seventeenth Day of May, 1994

Attest:

BRUCE LEHMAN

*Attesting Officer*    *Commissioner of Patents and Trademarks*